Sept. 15, 1959

W. L. CARNEGIE 2,903,910

TRANSMISSION AND CONTROL SYSTEM

Filed Feb. 5, 1953

INVENTOR
William L. Carnegie
BY
Willits, Helwig & Baillio
ATTORNEYS

Sept. 15, 1959  W. L. CARNEGIE  2,903,910
TRANSMISSION AND CONTROL SYSTEM
Filed Feb. 5, 1953  10 Sheets-Sheet 6

INVENTOR
*William L. Carnegie*
BY
*Willits, Helmig & Baillo*
ATTORNEYS

Sept. 15, 1959 W. L. CARNEGIE 2,903,910
TRANSMISSION AND CONTROL SYSTEM
Filed Feb. 5, 1953 10 Sheets-Sheet 7

INVENTOR
William L. Carnegie
BY
Willits, Helmig & Baillio
ATTORNEYS

United States Patent Office 2,903,910
Patented Sept. 15, 1959

2,903,910

TRANSMISSION AND CONTROL SYSTEM

William L. Carnegie, Romeo, Mich., assignor to General Motors Corporation, Detroit, Mich., a corporation of Delaware Application February 5, 1953, Serial No. 335,319

29 Claims. (Cl. 74—645)

This invention relates to transmissions and control systems, of the type embodying a torque converter for driving plural speed gearing, and a direct drive clutch for locking up the torque converter.

The transmission gearing mechanism is arranged to provide three forward drive range conditions of operation, neutral, and reverse. In low range operation torque multiplication is provided through both a planetary gearing unit and a torque converter. In second range of operation, direct drive is provided through a planetary gearing unit in conjunction with torque multiplication drive through a torque converter. In third drive range, the torque converter is locked up to provide direct drive without torque multiplication.

The control system may be arranged to lock up the torque converter in direct drive, and to provide for selection of reduction or direct drive in the planetary gearing unit while maintaining the torque converter locked up in its direct drive condition of operation. This operation sequence makes possible the selection of reduction drive in the planetary gearing unit for rapid vehicle acceleration, as may be necessary in many road conditions encountered by the vehicle operator.

The transmission gearing mechanism includes a power transfer shaft adapted to be driven selectively either by a direct drive clutch or a torque converter turbine member for driving a pair of ring gears of first and second planetary gearing units. A pair of sun gears for the first and second planetary gearing units, respectively, are carried by a sleeve adapted to be braked for reduction drive or clutched to the planet carrier of the first planetary gearing unit for direct drive. The carrier of the first planetary gearing unit is fixed to the power output shaft and constitutes the power output member of the planetary transmission. The planet carrier of the second planetary gearing unit is adapted to be braked for establishing reverse drive. The sun gear of the first planetary gearing unit is of greater diameter than the sun gear of the second planetary gearing unit and the planet gears of the first planetary gearing unit are of lesser diameter than the planet gears of the second planetary gearing unit. The second planetary gearing unit is utilized solely for the purpose of establishing reverse drive, and does not constitute a torque transfer member for forward drive operation. The first planetary gearing unit is coupled in the drive train both during forward reduction drive and reverse drive.

The control system for the transmission is adapted to provide for automatic shift from a first drive range wherein torque multiplication is accomplished through the torque converter and the planetary gearing unit to a second speed range wherein torque multiplication is achieved in the torque converter with direct drive through the planetary gearing unit, and wherein an automatic shift to direct lock up drive without torque multiplication may be accomplished. In this latter condition of operation, the torque converter impeller is locked to the torque converter turbine and the sun gears of the first and second planetary gearing units are both locked to the planet carrier of the first planetary gearing unit. The control system may be conditioned for low range operation wherein upshift from the lowest drive range of operation is prevented to provide for vehicle engine braking or for maximum torque.

Control of the line pressure supplied to the servos is normally a function of engine throttle setting to vary the line pressure in accordance with torque demand. However, in direct drive ratio, line pressure is controlled as a function of engine torque demand and vehicle speed to effect savings in horsepower utilized to supply the line pressure to the servos. In direct drive ratio the line pressure supplied to the servos is a function of both engine throttle setting and vehicle speed.

A reverse inhibitor valve responsive to pressure delivered by a vehicle speed responsive pump prevents the application of the reverse band servo at excessive vehicle speeds even though the manually operable selector valve may be positioned to select reverse. The manually operable drive range selector valve serves to prevent automatic upshift in reverse by cutting off the supply of fluid pressure to the transmission governor and by directing pump line pressure to a shift valve to positively maintain the shift valve in its downshift position.

These and other features, advantages, and objects of this invention will be apparent from the following detailed specification and claims taken in conjunction with the accompanying drawings, in which:

Figure 1:
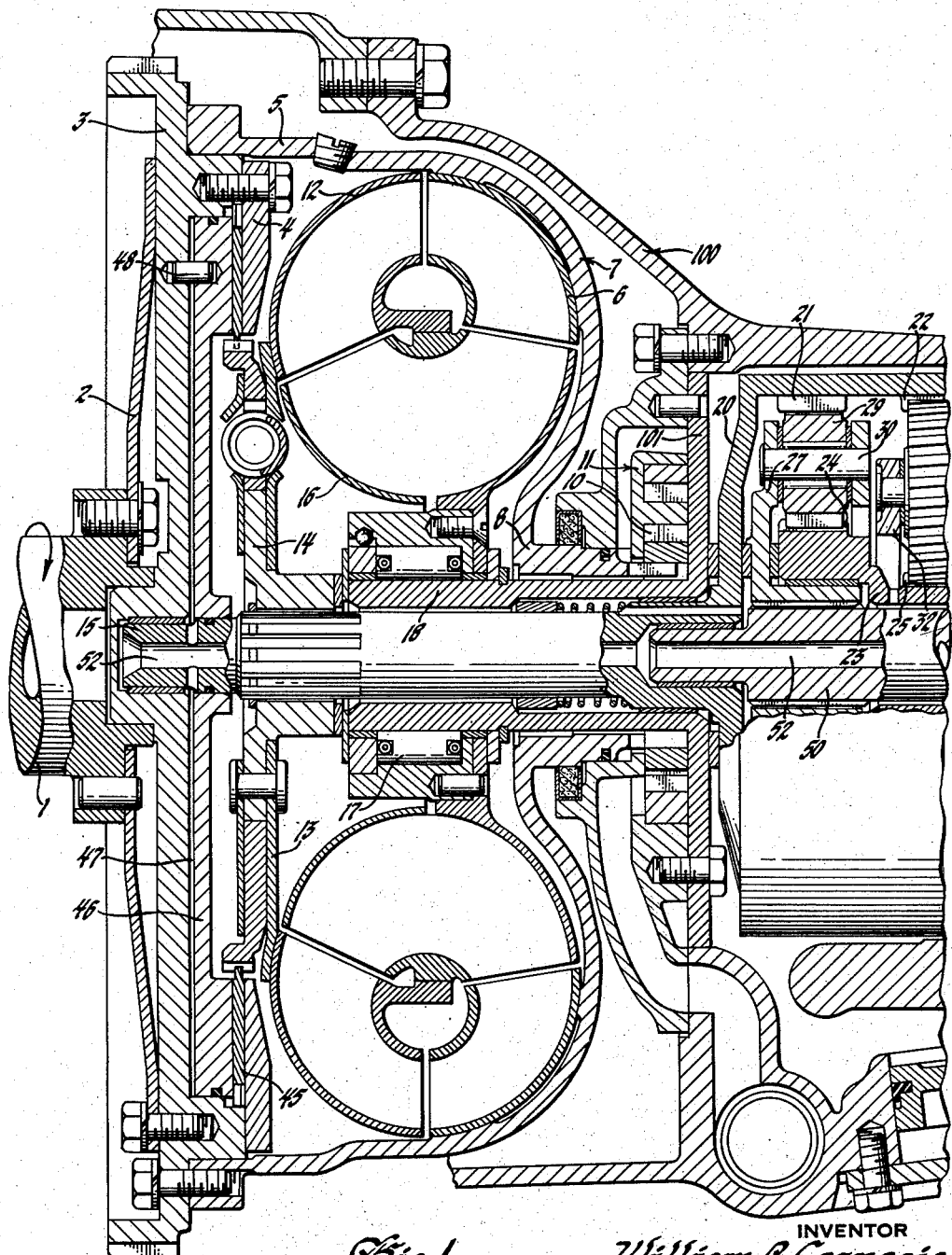
Figure 1 is a longitudinal section of the front portion of the transmission.
Figure 1A:
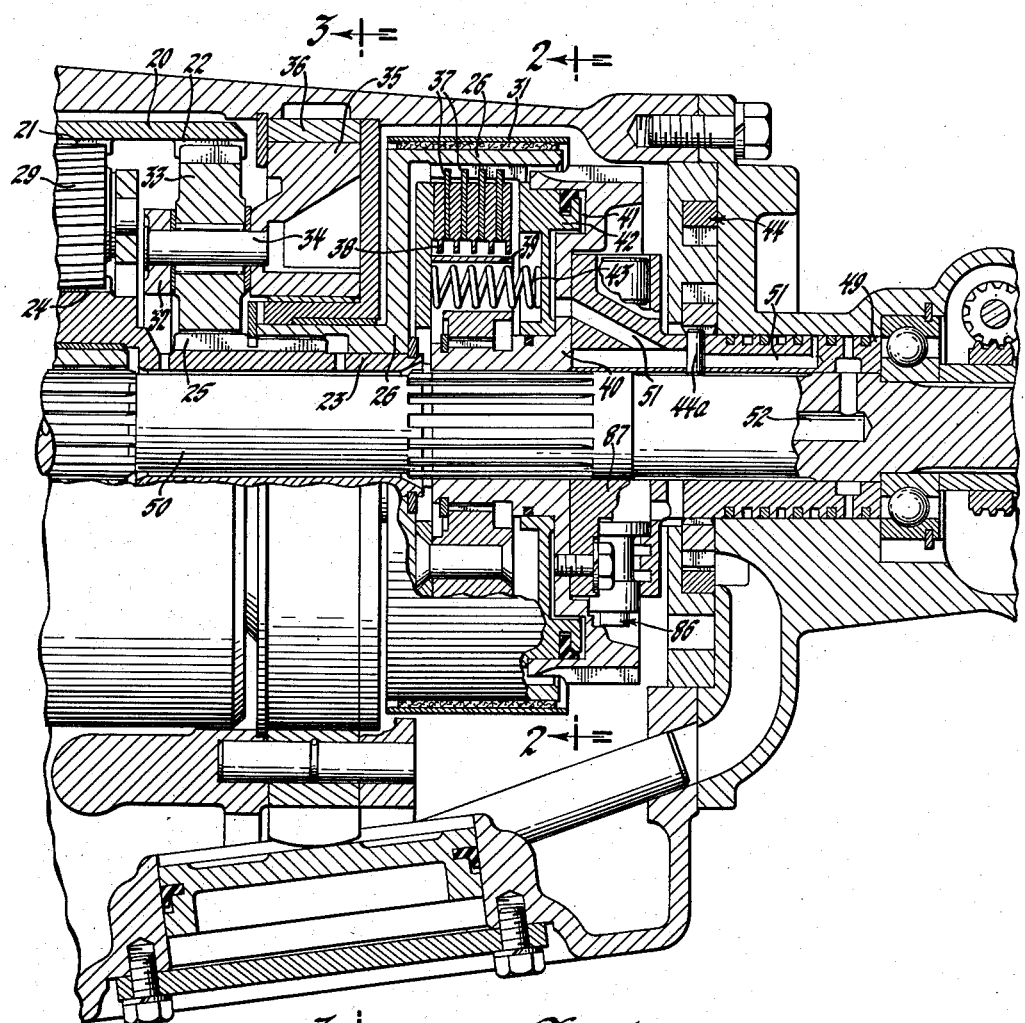
Figure 1A is a similar section of the rear portion of the transmission.

In Figures 1 and 1A, there is shown a sectional view of the transmission embodying a hydrokinetic torque converter, a planetary gearing unit for providing planetary reduction, direct drive, neutral or reverse, and a direct drive clutch for locking up the torque converter to provide direct mechanical drive in conjunction with the planetary gearing unit direct drive clutch.

An engine driven power input shaft 1 is bolted to a cover plate 2 bolted to a flywheel 3. An inwardly extending clutch flange 4 and drum 5 are bolted to flywheel 3. Drum 5 is attached to an impeller 6 of a torque converter 7 and has the collar portion 8 connected to a drive gear 10 of gear pump 11 nested in a web 101 of a housing 100. The driven rotor or turbine member 12 of the torque converted drives a clutch hub 14 splined to an intermediate torque transfer shaft 15. The usual reaction element 16 of the torque converter is coupled by any suitable one-way roller brake 17 to a sleeve 18 of housing web 101. An annulus member 20 is splined to shaft 15 and carries a low speed ring gear 21 and a reversing ring gear 22. A sleeve 23, carrying low sun gear 24 and reversing sun gear 25, is splined to a brake drum 26 adapted to be held by a brake band 31. Low sun gear 24 is of greater diameter than sun gear 25. A low planet carrier 27, splined to the transmission power output shaft 50 supports a planet gear 29 on a shaft 30, the planet gear 29 being in constant mesh with ring gear 21 and sun gear 24. A reversing planet carrier 32 supports a planet gear 33 on a shaft 34, gear 33 being in constant mesh with ring gear 22 and sun gear 25. Carrier 32 has brake drum 35 adapted to be held by a brake band 36. While only single planet gears 29 and 33 of each gearing unit are shown, it will be understood that a plurality of such gears, preferably three or four, are supported by each carrier 27 and 32, respectively. Low brake drum 26 carries a plurality of friction clutch plates 37 adapted to mate with clutch plates 38 to form a direct drive clutch splined to a clutch hub 39. Clutch hub 39 is splined to a housing element 40 which is in turn splined to power output shaft 50. Housing 40 provides a pressure chamber 41 in which is positioned a piston 42 adapted to apply clutch plates 37 and 38 for locking up the forward drive planetary gearset when fluid pressure is supplied to chamber 41 through passage 51 from gland 49. A spring 43 carried by clutch drum 39 releases the clutch plates upon release of fluid pressure from chamber 41.

It will be noted that planet gear 33 is of a considerably larger diameter than the diameter of planet gear 29. To establish reduction drive through the planetary gearing unit, band 31 is applied to drum 26 to prevent rotation of sun gears 24 and 25. Band 36 and clutch 38—39 are released. With sun gear 24 held against rotation, and with power applied to ring gear 21, planet carrier 27 and output shaft 50 are driven forward at a reduced speed with respect to the speed of rotation of shaft 15. For direct drive through the planetary gearing unit, fluid pressure is supplied to chamber 41 to apply clutch 38—39. This locks sun gears 24 and 25 to carrier 27 through power output shaft 50. Since carrier 27 and sun gear 24 are both locked to power output shaft 50, the planetary gearing unit is, in effect, locked up for direct drive.

For reverse band 36 is applied to drum 35 to hold carrier 32, and planet pinion 33 serves as a reversing idler to drive sun gear 25 oppositely to ring gear 22. This also drives sun gear 24 in reverse and this is assisted by the ring gear 21 because the drive wheels of the vehicle initially hold the carrier 27, so that the ring gear 21 through pinion 29 tends to rotate the sun 24 in the same direction. Whether or not the carrier 27 will rotate, and in which direction, depends upon the relative linear speeds in their opposite directions of rotation of the ring gear 21 and the sun gear 24. This is in turn dependent on the sizes of the various gears. The speed of rotation of the sun gears is determined by the ratio of the planetary gear set 22—33—25 and it is evident that this will rotate the sun gears faster than the ring gears. The relative sizes of the sun gears 25 and 24 are chosen so that not only does the sun gear 24 rotate at a faster linear speed in the reverse direction than the forward linear speed of the ring gear 21 but the differences in speed is such as to give the desired speed ratio between ring gear 22 and carrier 27.

A direct drive clutch plate 45 is splined to clutch hub 14 for locking up the torque converter to establish direct mechanical drive from the engine to the output shaft 50 through the planetary gearing unit. Clutch plate 45 is engaged against clutch drum flange 4 by means of a piston 46 upon admission of fluid pressure to chamber 47 behind piston 46. Piston 46 is pinned to flywheel 3 by means of a pin 48 so as to rotate with flywheel 3, but is axially movable toward and away from clutch plate 45. Fluid pressure to apply the direct drive clutch may be admitted to chamber 47 by way of previously mentioned gland 49, and through passage 52 in shafts 50 and 15.

Figure 2:
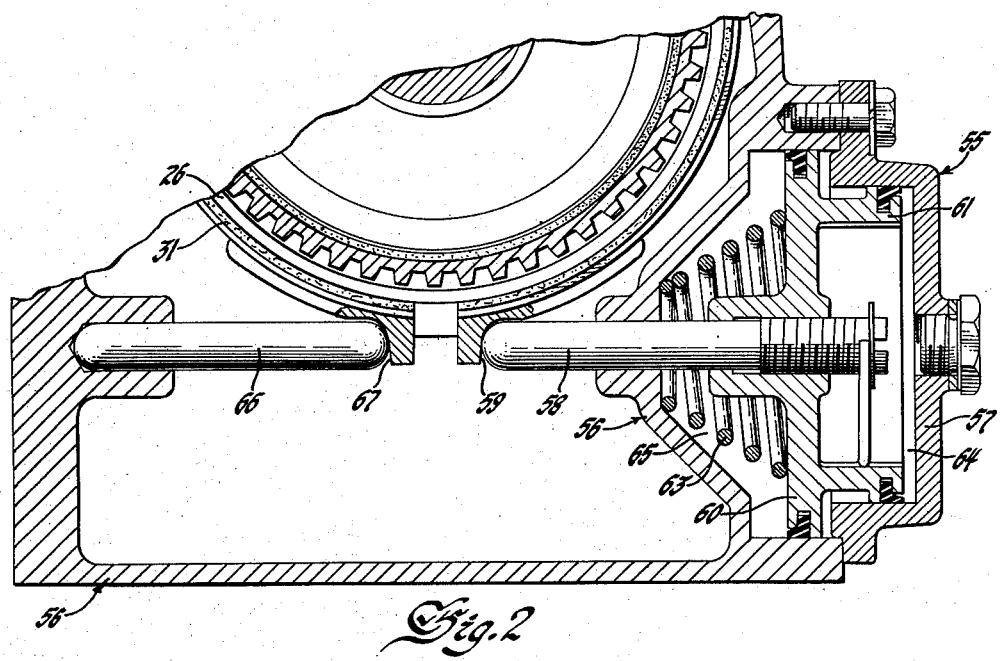
Figure 2 is part of a transverse section of the servo mechanism for actuating the low gear band for reduction drive through the planetary gearing unit.

The low gear band 31 is applied to drum 26 by means of a servo member 55 shown in Figure 2. A housing 56 supports a cover plate 57 bolted thereto to form a chamber adapted to receive a stem 58 extending through said housing to contact a grooved portion 59 on one end of bank 31. A web member 60 secured to stem 58 constitutes a relatively large piston, the web member or piston 60 having a laterally extending flange 61 constituting a relatively small piston. A spring 63 yieldably biases the piston 60, and piston 61 carried by piston 60, to release the band 31. Fluid pressure may be admitted to chamber 64 to apply the band 31. Fluid pressure may be admitted to spring chamber 65 and to chamber 64 simultaneously to release the band. In the event that fluid pressure is applied to both chambers 64 and 65, the band will be released due to the effect of spring 63 and due to the relatively large effective area of piston 60 with respect to the area of piston 61. A pin 66 fitted into housing 56 and into a groove 67 at the opposite end of band 31 acts as a reaction member when stem 58 is moved outwardly from housing 56 to apply the band.

Figure 3:
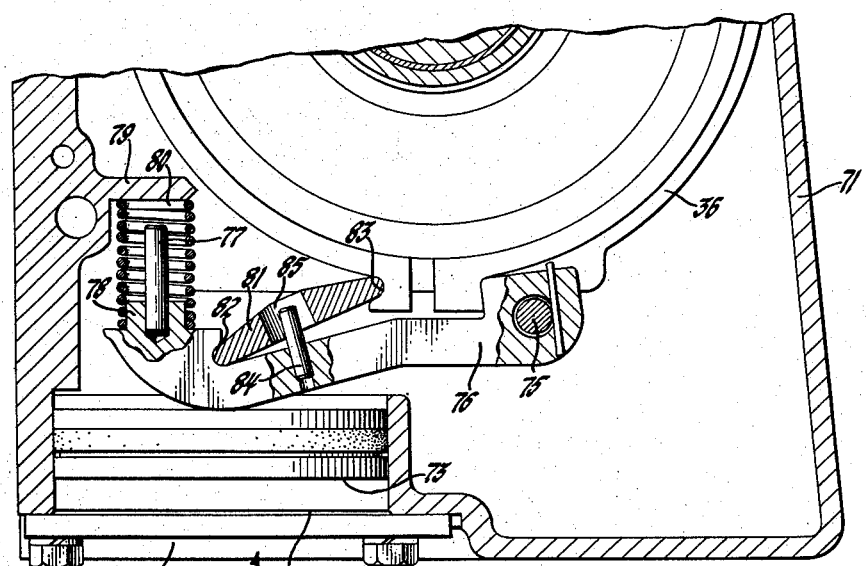
Figure 3 is part of a transverse section of the servo mechanism for actuating the reverse gear band for establishing reverse reduction drive through the transmission planetary gearing unit.

The reverse band servo 70 for applying reverse band 36 to planet carrier drum 35 of Figure 1a is shown in Figure 3. A housing member 71 is shaped to form a cylindrical space 72 in which is positioned a piston 73. A cover plate 74 is bolted to housing 71 to close off one end of chamber 72. Pivotally mounted on one end of band 36 by means of a pin 75 is an arm 76 extending to contact piston 73. Arm 76 carries a pin 77 fixed thereto in a boss 78. A flange 79 of housing 71 acts as a base for one end of a spring 80, the opposite end of spring 80 extending around boss 78 to contact arm 76. A floating strut 81 extends between a grooved portion 82 of arm 76 and a grooved portion 83 at one end of band 36. A pin 84 carried by arm 76 extends into an opening 85 in strut 81 to prevent the strut from becoming disengaged from arm 76 and band 36. Spring 80 yieldably biases arm 76 to release the band. When fluid pressure is admitted to chamber 72, piston 74 is forced against arm 76, compressing spring 80 and causing arm 76 to rotate about pin 75. As arm 76 rotates, strut 81 transfers force to band 36 causing the band to become applied to drum 35 of Figure 1. In reverse, relatively high torque is transmitted through the transmission, and consequently a relatively high force is required to apply the band and prevent band slippage. Due to the length of arm 76 and the location of strut 81 remote from pivot pin 75, a relatively large torque multiplication through the mechanical linkage from piston 73 to band 36 is accomplished. This permits the use of a relatively small compact servo on the transmission.

Figure 4:
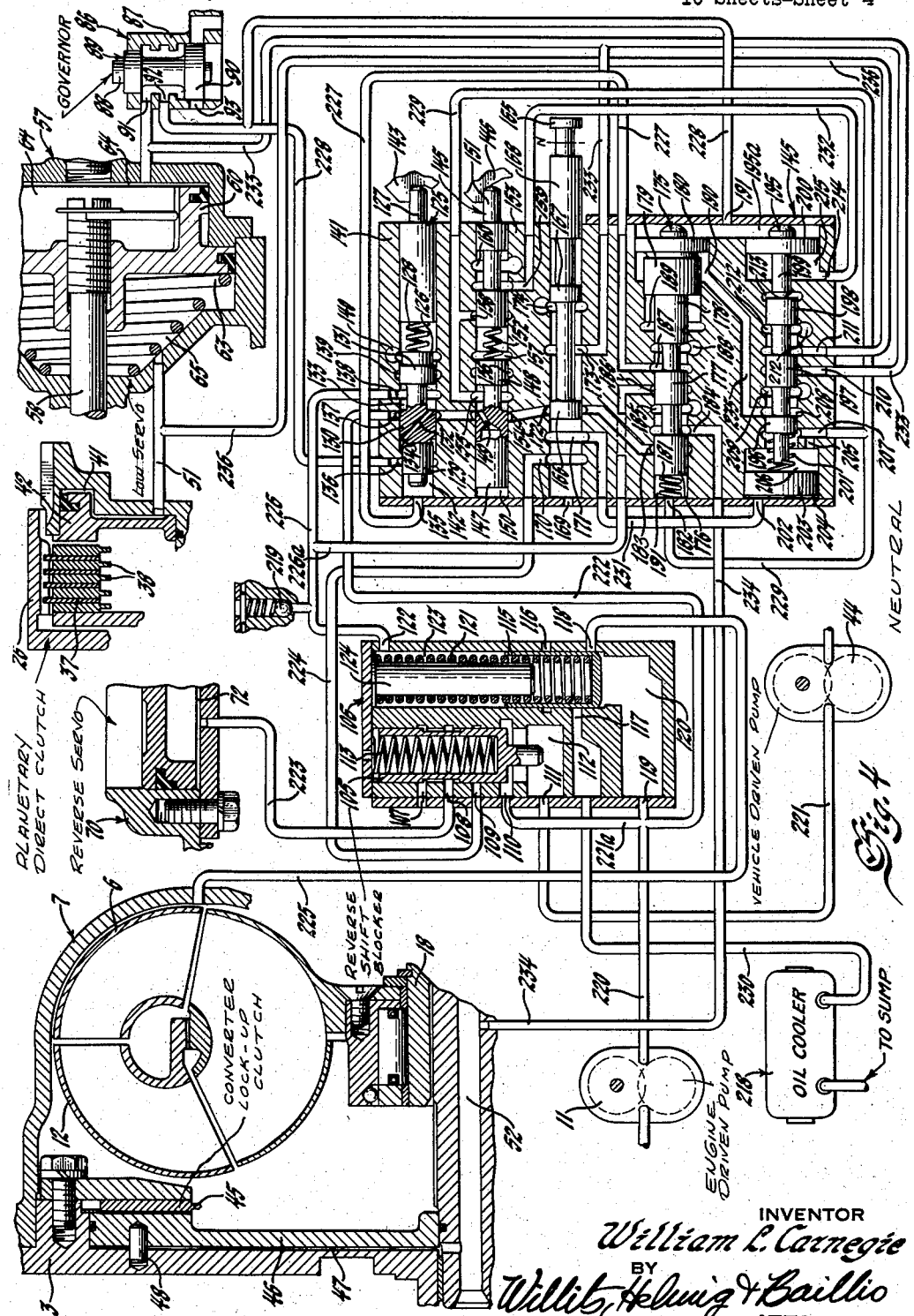
Figure 4 is a schematic diagram of the transmission control system illustrating the transmission as conditioned for neutral or no drive operation.

The hydraulic control system for controlling the various band and clutch servos to establish different transmission drive ratios is shown in Figures 4 through 9. In general, the control system shown in Figure 4 is made up of an engine driven pump 11, a transmission power output driven pump 44, a reverse shift blocker valve 105, and a pressure regulator valve 115 both in the left-hand valve body, a pair of pressure metering valves 125 and 145 in the upper part of the right-hand valve body, a manually operable selector valve 165, a pair of shift valves 175 and 195, and a vehicle speed responsive governor 86. Pump 44 and governor 86 are both vehicle speed responsive and deliver a variable pressure which increases with increase of vehicle speed. Governor 86 is driven by power output shaft 50 of Figure 1a through housing portion 40 of Figure 1a splined to shaft 50 and bolted to the housing portion 87 of Figure 1a in which the governor valve 88 is carried. The vehicle speed responsive pump 44 is driven by output shaft 50, the drive gear of the pump being pinned to shaft 50 by a pin 44a (see Figure 1a).

Reverse blocker valve

Reverse blocker valve 105 is positioned in a housing 106, the housing 106 being provided with five ports 107, 108, 109, 110, and 111, associated with valve member 105. Port 107 exhausts to the transmission sump. Port 108 connects to a passage 223 leading to chamber 72 of reverse servo 70. Port 109 connects to a passage 224 controlled by the drive range selector valve 165. Port 110 connects to line pressure delivery passage 221a, through which pump line pressure is supplied by way of passage 222, to pressure metering valves 125 and 145, selector valve 165 and shift valve 175. Pump pressure in passage 221 from vehicle speed responsive pump 44 is delivered through port 111 to a chamber 112 beneath reverse blocker valve 105. At vehicle speeds above a predetermined vehicle speed, for example, six miles per hour, pressure from pump 44 in chamber 112 is effective to move valve 105 against a spring 113 to connect passage 223 to exhaust port 107. Thus, accidental shift to reverse is prevented at speeds above a predetermined vehicle speed even though the selector valve 165 may be positioned to select reverse drive.

Pressure regulator valve

The pressure regulator valve 115 controls the pump line pressure delivered to the various fluid pressure responsive servo members, the delivery of fluid pressure to the torque converter 7, and the delivery of fluid pressure to an oil cooler 218. Housing 106 for pressure regulator valve 115 is provided with ports 116, 117, 118 and 119. Port 116 exhausts to the transmission sump. Port 117 connects to passage 230 leading to oil cooler 218. Port 118 connects to passage 225 leading to the torque converter, and port 119 admits pressure from engine driven pump 11 to a chamber 120 beneath valve body 115. Valve 115 is biased by a spring 121 to initially block off all of the pressure delivery passages aforementioned from chamber 120 when the vehicle engine is stopped. An additional port 122 admits oil to the chamber 123 above the valve 115, from compensator valve 125. The pressure of this oil is dependent on throttle position and varies main line pressure with torque demand on the engine.

When the vehicle engine is started, valve 115 is moved against spring 121, by the pressure of the engine driven pump 11 to open port 118 to admit oil to torque converter supply passage 225, and after the line pressure has been built up to a predetermined pressure level to dump any excess oil to open port 117 to oil cooler delivery passage 230. In the event that the pumps 11 and 44 supply a greater quantity of oil than can pass through the converter and oil cooler in any given time period, valve 115 moves to uncover port 116 which functions as a safety blow-off exhaust port for such excess oil. A pressure relief valve 219 is placed in passage 226. At vehicle speeds above a predetermined vehicle speed, pump pressure from vehicle speed responsive pump 44 is admitted to line pressure delivery passage 222 through port 110 and passage 221a.

Compensator valve

At the right hand side of Figure 4, the remainder of the control valves and the governor 86 are shown. A first pressure metering valve 125, which may be termed a compensator valve, is for the purpose of increasing the line pressure as the engine throttle is opened. It resists opening of the regulator valve 115 to vary the line pressure supplied to the servos in accordance with torque demand placed on the engine and in accordance with the drive ratio in which the transmission is operating. The compensator valve 125 is shown in more detail in Fig. 10, and includes a valve proper 126 urged to the left by a plunger section 127 extending from the right of the valve casing. Valve section 126 is made up of lands 129, 130 and 131. Lands 130 and 131 are of equal diameter and both are of greater diameter than that of land 129. A passage 132 is drilled through land 130 to permit fluid pressure communication from chamber 133 between lands 130 and 131 to chamber 134 between lands 130 and 129. Six ports 135, 136, 137, 138, 139 and 140 are provided in valve casing 141. The extreme left hand port 135 connects a chamber 142 at the end of land 129 to a passage 227 controlled by a converter lock-up clutch shift valve 175. See Fig. 4. The next port 136 connects to a governor pressure delivery passage 228. The next port 137 connects to line pressure supply passage 222, and surrounds the land as is well known. The lower side of the port 137 as seen in Fig. 4 communicates with port 154 of a throttle valve 145, as will appear. Port 138 connects to compensator pressure delivery passage 226, and ports 139 and 140 exhaust to sump. Chamber 142 at the left of the compensator valve is exhausted to sump through shift valve 175 at all times except when the shift valve 175 is placed in its upshift or direct drive position. This is by conduit 227 and port 187 and exhaust port of the shift valve. Plunger 127 of the compensator valve is controlled by a cam 143 controlled by a linkage from the vehicle accelerator pedal (not shown) to force plunger 127 to the left into casing 141 against spring 128 as the engine throttle is opened. As spring 128 is loaded by movement of plunger 127, valve 125 tends to move to the left, opening port 137 to admit oil from main line 122 and to connect port 137 to port 138 to deliver pressure above the regulator valve 115 through passage 226. Pressure in chamber 133 is admitted to chamber 134 through passage 132 and acts upon land 130 tending to force the valve against spring 128 to close port 137 to cut off oil from main line passage 222. Excessive pressure in 134 may even open exhaust port 139 to reduce pressure in chamber 133. This maintains in chamber 133 a pressure which increases with throttle opening. Thus the pressure level of fluid pressure delivered to passage 226 increases as the torque demanded from the engine increases and acting in chamber 123 of the pressure regulator valve 115, causes valve 115 to increase the pressure in the main line delivered to the servos as the engine throttle is opened. This prevents slippage of the clutch or brakes at high torque loading.

Throttle valve

The second variable pressure delivery valve 145, termed a throttle valve, is also controlled by a cam 146 moved by a linkage (not shown) connected to the vehicle accelerator pedal. Valve 145 is composed of lands 147 and 148, see Fig. 10, there being a passage 149 through land 147 to admit pressure fluid to a chamber 150 at left of the valve. A plunger 151 controlled by cam 146 is forced into the casing as the engine throttle is opened. A spring 152 is interposed between valve land 148 and plunger 151. The valve casing 153 is provided with ports 154, 155, 156, 157, 158, 159 and 160, Fig. 4. Port 154 connects to line pressure delivery passage 222 by way of port 137 in compensator valve 125 and surrounds the land 147 to communicate with port 172 of the manual valve 165, as will appear. Port 155 connects to throttle valve delivery passage 229. Ports 156 and 157 exhaust to the transmission sump. Port 158 connects to throttle valve delivery passage 229. Port 159 connects to a so-called forced downshift passage 232 leading to shift valve 145, and port 160 exhausts to the transmission sump. The function of the throttle valve 145 is to yieldably bias the shift valves 175 and 195 toward their downshift or low speed positions, by a force which increases with throttle opening, and thus delay upshift when torque demand is high, as is well known.

Manual selector valve

Figure 11:
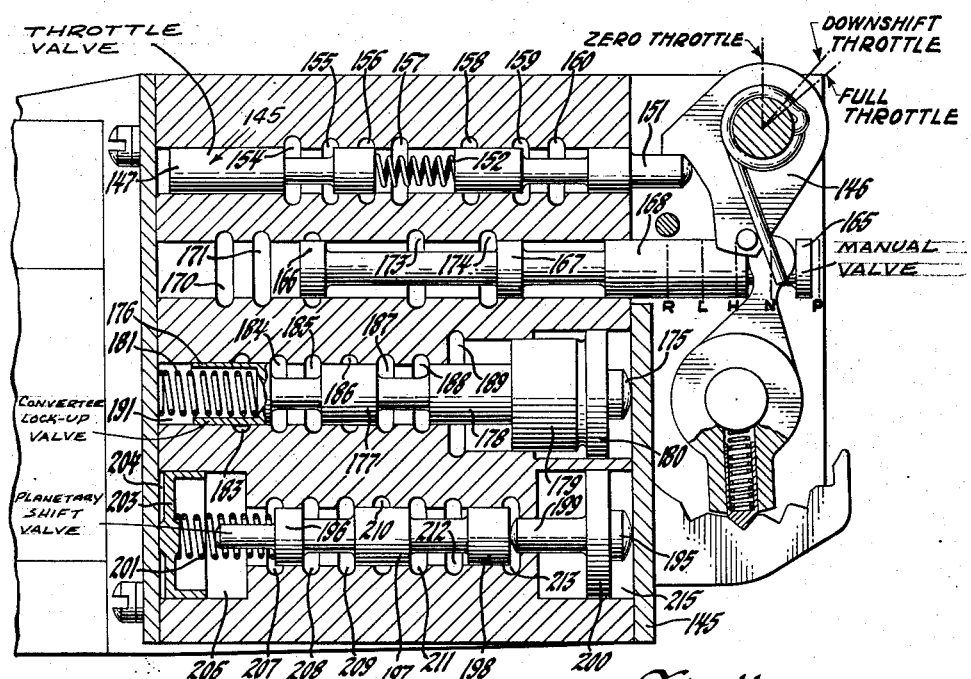
Figure 11 is a partially sectional view of the valve control box illustrating the cam for operating one of the pressure metering valves of Figure 10 and a lever for selectively positioning the manually operable selector valve to select different conditions of transmission operation.

Fig. 11 shows as the second valve from the top a manually operable selector valve 165 controlled by a suitable linkage (not shown) connected to a drive selector lever positioned on the vehicle steering column, not shown. Valve 165 may be positioned to select neutral, drive range, low range, reverse, and park conditions of operation. Valve 165 is made up of lands 166, 167 and 168. As shown in Fig. 4 six ports 169, 170, 171, 172, 173 and 174 are provided in the valve casing. Port 169 exhausts to the transmission sump. Port 170 connects to passage 224 leading to port 109 of reverse inhibitor valve 105. Port 171 connects to passage 231 leading to a downshift chamber 204 of the planetary gearing shift valve 195. Port 172 connects to line pressure supply passage 222 through port 152 of throttle valve 145 and port 137 of the compensator valve 125. It also surrounds the valve chamber to connect with port 183 of the converter lockup valve 175, as will appear. Port 173 connects to governor pressure supply passage 233. Port 174 exhausts to sump.

Converter lockup clutch shift valve

A shift valve 175 controls the admission of fluid pressure to the torque converter lock up clutch chamber 47 and also is effective in its upshift or direct drive position to admit compensator pressure to chamber 142 of the compensator valve to materially reduce the line pressure when the torque converter is locked up. The shift valve 175 is composed of lands 176, 177, 178, 179 and 180. Lands 176, 177 and 178 are of equal diameter. Land 179 is of greater diameter than lands 176, 177 and 178, and land 180 which forms a piston for governor pressure is of greater diameter than land 179. A spring 181 biases the valve toward its downshift position. Ports 182, 183, 184, 185, 186, 187, 188, 189 and 190 are associated with the shift valve 175. Port 182 connects to throttle valve delivery passage 229 to admit throttle valve pressure from throttle valve 145 to a chamber 191 at one end of land 176. Port 183 connects to line pressure supply passage 222 by way of port 172 of the manual valve, port 154 of the throttle valve and port 137 of the compensator valve. Port 184 connects to converter lock-up clutch supply passage 234 connected to passage 52 of Fig. 1. Port 185 exhausts to sump. Port 186 connects to branch 226a of compensator pressure delivery passage 226. Port 187 connects to passage 227 leading to chamber 142 of the compensator valve. Ports 188 and 189 exhaust to sump. Port 190 connects to passage 235 leading to the planetary gear shift valve 195 and port 191 connects to governor pressure delivery passage 228. In its downshift position shown in Figure 4, converter lock-up clutch valve 175 exhausts the clutch apply chamber through ports 184 and 185.

Referring further to Figure 4, a planetary gearing direct drive clutch control valve 195 is shown. Valve 195 is made up of lands 196, 197 and 198 and is associated with a governor plunger 199 having a land or piston 200. Governor plug 199 contacts land 198. A spring 201 bottomed upon a piston 203 biases the shift valve 195 toward its downshift or low gear drive position. Port 202 admits pressure from passage 231 leading from the manual valve to a chamber 204 adjacent piston 203 when fluid pressure under control of selector valve 165 is admitted to passage 231. Port 205 admits throttle valve pressure from passage 229 to a chamber 206 at one end of land 196. Port 207 admits throttle valve pressure from passage 229 to port 208 connected to passage 235 leading to the lockup clutch shift valve when the planetary gear shift valve is in its upshift position. Port 209 exhausts to sump. Port 210 connects to governor pressure supply passage 233. Port 211 connects to passage 236 leading to passage 51 of Fig. 1 connected to chamber 41 of direct drive clutch 37—38. Passage 236 is also connected to chamber 65 of low band servo 57. Ports 212 and 213 exhaust to sump. Port 214 connects to forced downshift passage 232 controlled by throttle valve 145. Port 191 connects to governor pressure delivery passage 228.

Governor

The vehicle speed responsive governor 86 is made up of a governor valve 88 composed of lands 89 and 90, the land 90 being of greater diameter than the diameter of land 89. Governor pressure supply passage 233 is connected to port 91 of the governor and to chamber 64 of the low band servo. Port 92 connects to passage 228. Governor pressure deliver passage 228 is connected to port 136 of compensator valve 125 and to port 191 of shift valve 175 and the shift valve 195. Port 93 of governor casing 87 exhausts to the transmission sump. Governor housing 87 is rotated by output shaft 50 (Fig. 1a) so that centrifugal force with increasing vehicle speed tends to move valve 88 so that land 90 cuts off exhaust port 93 and land 89 uncovers port 91 to admit pressure from passage 233 to governor pressure delivery passage 228. Due to the different areas of lands 89 and 90, pressure delivered by valve 88 urges the valve inward against centrifugal force, tending to cause the valve to cut off supply passage 233 and exhaust governor pressure delivery passage 228 through port 93. The pressure delivered by the governor therefore increases with increase of vehicle speed and decreases with decrease of vehicle speed.

Hydraulic control—neutral (Fig. 4)

With the selector valve 165 positioned for neutral condition of operation as shown in Figure 4, line pressure from passage 222 is blocked off from governor pressure supply passage 233 by land 166. Governor passage 233 is exhausted to sump through ports 173 and 174 of valve 165. The low band apply chamber 64 of servo 57 is likewise exhausted to sump through passage 233 and ports 173 and 174 of valve 165. Since the supply of pressure to governor 86 is cut off, no governor pressure can exist in governor pressure delivery passage 228. Shift valves 175 and 195 are biased by springs 181 and 201 to their downshift position. Planetary gearing direct drive clutch pressure delivery passage 236 is exhausted through ports 211 and 212 of shift valve 195.

Torque converter lock-up clutch pressure delivery passage 234 is exhausted to sump through ports 184 and 185 of shift valve 175. Reverse band pressure supply passage 223 is exhausted through ports 108 and 107 of reverse inhibitor valve 105, and reverse passage 224 is exhausted through ports 170 and 169 of selector valve 165. With all of the clutches and bands released, no torque can be transferred through the transmission, and the transmission is in neutral.

Figure 5:
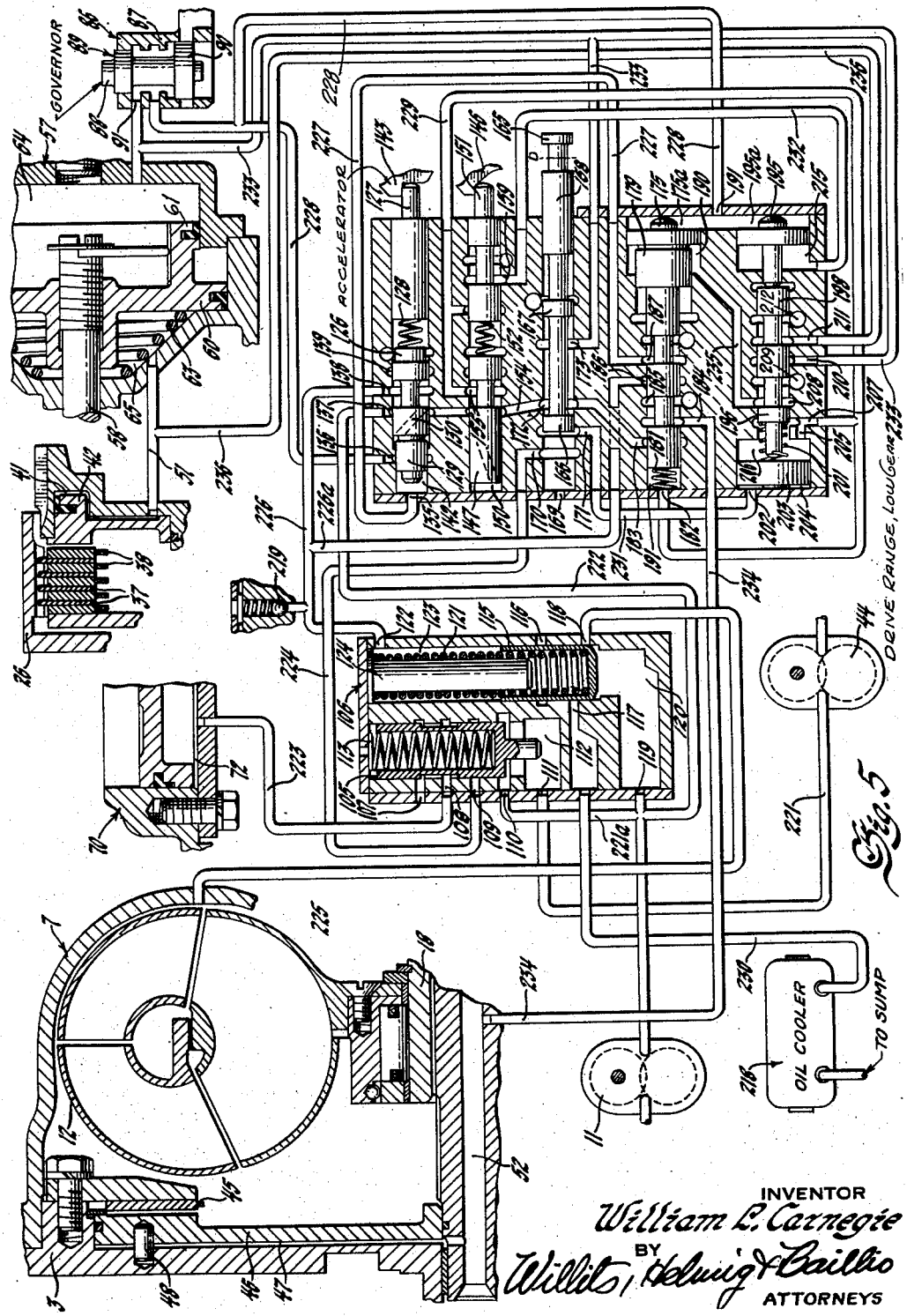
Figure 5 is a schematic diagram of the control system as conditioned for drive range, first gear operation.

Drive range—first speed (Fig. 5)

The position of selector valve 165 for drive range, and the shift valves for first speed is illustrated in Figure 5. With the selector valve 165 positioned for drive range operation, line pressure is admitted to the selector valve at port 172 from passage 222 by way of port 137 of compensator valve 125 and port 154 of throttle valve 145 and is directed to passage 233 through port 173 of valve 165, this pressure acting in chamber 64 of servo 57 to apply low band 31 to drum 26 of Fig. 1. This places the planetary gearing unit in low-low, there being torque multiplication in both the torque converter and planetary gearing unit. Although governor pressure is being delivered through passage 228 to chambers 175a and 195a to the right of shift valves 175 and 195, this pressure at low vehicle speeds is relatively small. Throttle valve pressure from throttle valve port 155, by way of passage 229 acting in chambers 191 and 206 of shift valves 175 and 195 and springs 181 and 201 are effective to maintain the shift valves in their downshift position. Torque converter lock-up clutch chamber 47 is exhausted through passage 234 and ports 184 and 185 of valve 175. Planetary gearing unit direct drive clutch chamber 41 is exhausted through passage 236 and ports 211 and 212 of shift valve 195. Reverse servo chamber 72 is exhausted through passage 233 and ports 108 and 107 of valve 105. With band 31 applied, the transmission is in low gear.

*Drive range—second speed (Fig. 6)*

Figure 6:
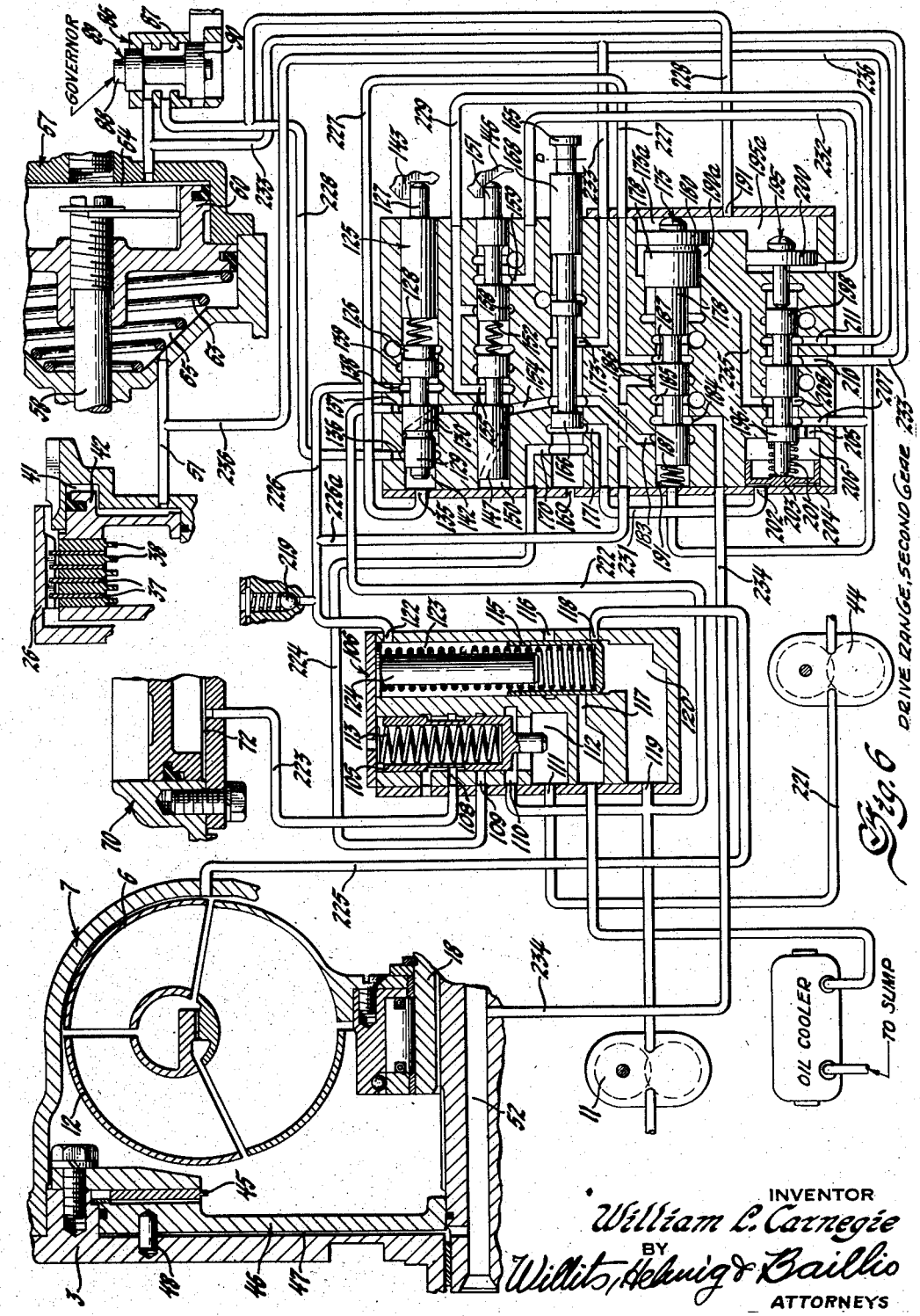
Figure 6 is a schematic diagram of the control system as conditioned for drive range, second gear operation.

With the transmission selector valve in drive range, an automatic shift from first to second gear may be accomplished with an increase of vehicle speed. The shift valves are illustrated in Fig. 6 in their second speed position. Governor pressure in chamber 195a to the right of shift valve 195 has increased with increase of vehicle speed until the governor pressure has overcome both the force of throttle valve pressure in chamber 206 and the force of spring 201 and shift valve 195 has been thereby moved to its upshift position shown to admit line pressure from passage 233 to passage 236. Pressure from passage 236 acting in chamber 41 applies clutch 37—38. Pressure from passage 236 also is directed to chamber 65 of servo 57 to release band 31 in spite of line pressure existing in chamber 64 of servo 57 and tending to apply band 31. The area of piston 60 is greater than that of piston 61 so that spring 63 and fluid pressure in chamber 65 release band 31. With clutch 37—38 applied and band 31 released, the transmission is conditioned for second gear operation.

When shift valve 195 moves to its upshift or second speed position it applies an additional force to hold the torque converter lock-up valve 175 in release position. Throttle valve pressure from port 155 of throttle valve 145 and passage 229 is admitted to chamber 190a of torque converter lock-up valve 175 through ports 207 and 208 of valve 195 and passage 235. Throttle valve pressure is therefore effective in both chambers 191 and 190a of valve 175 to maintain shift valve 175 in its downshift position even though governor pressure in chamber 175a is increasing as the vehicle accelerates in second gear. In second speed ratio, drive is through the torque converter and the direct drive clutch of the planetary gearing unit. There can, therefore be no torque multiplication in the gearing unit in second speed. Torque converter clutch pressure supply passage 234 is exhausted through ports 184 and 185 of valve 175.

*Drive range—third speed (Fig. 7)*

Figure 7:
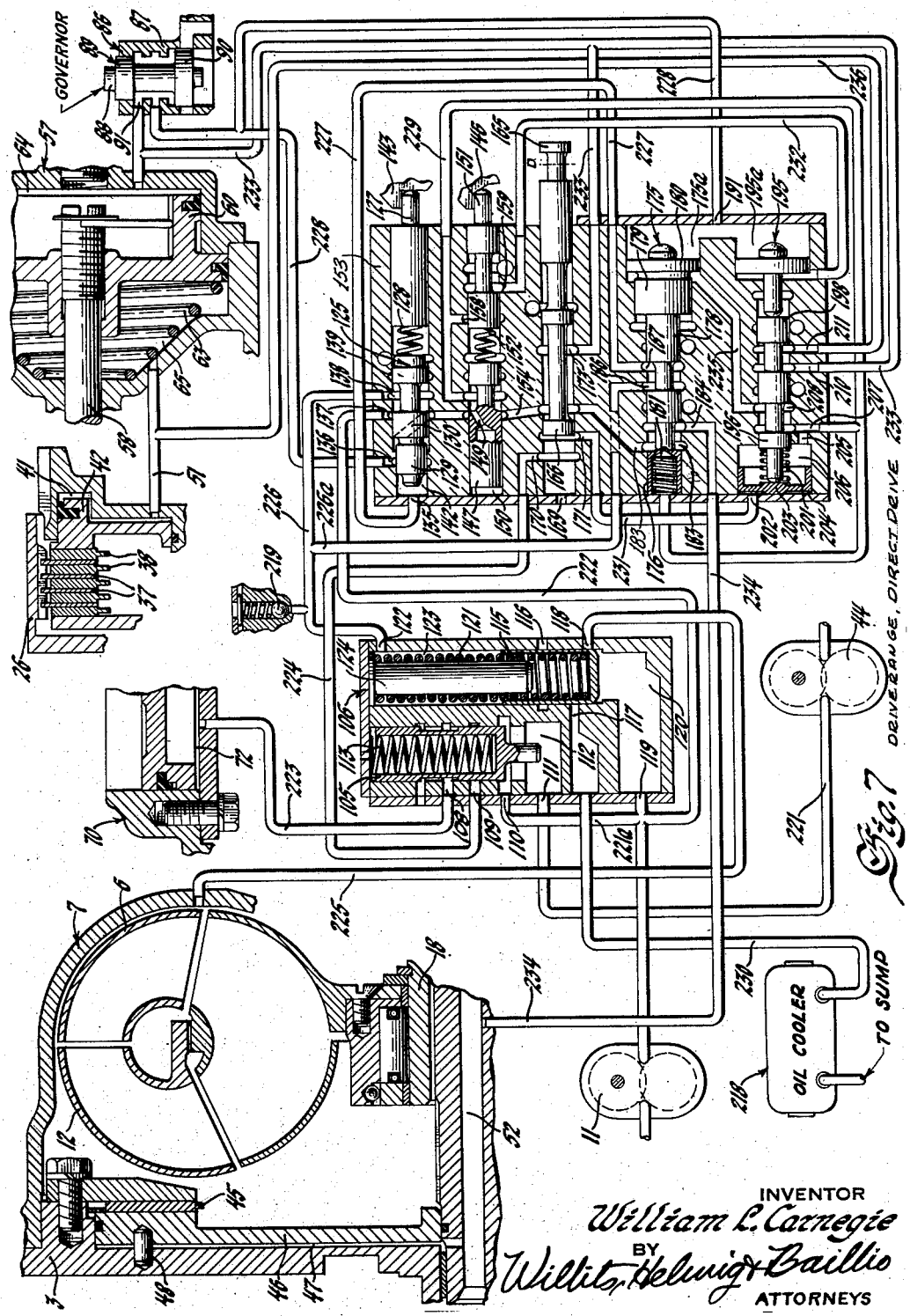
Figure 7 is a schematic diagram of the control system as conditioned for drive, range, third gear or direct drive operation.

With the selector valve in drive range position an additional automatic shift to direct drive can be accomplished. The position of the shift valves for direct drive is shown in Figure 7. Upon further acceleration of the vehicle in second speed, increasing governor pressure acting in chamber 175a upon shift valve 175 has moved it to the left, into its upshift position shown in Figure 7. Line pressure is thereupon admitted from the manual valve 165 and ports 183 and 184 to torque converter lock-up clutch passage 234 to apply direct drive clutch 45. At the same time, compensator pressure from passage 226a is admitted to chamber 142 of compensator valve 125 by way of ports 186 and 187 of valve 175 and passage 227. Compensator pressure in chamber 142, for a given throttle setting, moves valve 125 to admit governor pressure from passage 228 to chamber 142 and passage 227 through ports 136 and 135. The governor pressure acting upon land 129 of compensator valve 125 thereafter regulates the compensator pressure as a function of vehicle speed and throttle setting rather than a function of throttle setting alone. Governor pressure acting in chamber 142 tends to reduce the line pressure supplied to the two direct drive clutch chambers 41 and 47. Since the torque converter is locked-up in third gear and the planetary is locked-up no torque multiplication can occur. Thus, less line pressure is necessary to maintain the servos applied without slippage than is the case in first or second drive ratio. Reduction of line pressure in direct drive as a function of vehicle speed and throttle setting results in savings of horsepower consumption with consequent economy of operation and also results in a smooth shift from second gear drive to direct drive operation. Pressure from passage 227 is admitted to chamber 123 of pressure regulator valve 115 by way of ports 187 and 186 of valve 175, passage 226a, and passage 226 when valve 175 is in its upshift position.

*Forced downshift*

For rapid vehicle acceleration when operating in second gear, as through the torque converter and planetary gearing unit direct drive clutch 37—38, a forced downshift may be accomplished by depressing the vehicle accelerator pedal to the floorboard. When this is done, throttle valve plunger 151 is moved into casing 153 to admit throttle valve pressure from passage 229 to passage 232 by way of ports 158 and 159. The throttle valve pressure acting in chamber 215 of shift valve 195 (see Fig. 8), together with the effect of throttle valve pressure from throttle valve port 155 and pipe 229 in chamber 206 of shift valve 195 and spring 201, are effective to overcome the force of governor pressure in chamber 195a, and thereby move valve 195 to its downshift position shown in Figure 8 to establish low gear drive. Upon release of the accelerator pedal, the transmission will automatically upshift to second speed.

*Low range (Fig. 8)*

For purposes of engine braking, as in descending a steep grade, or for high torque demand conditions of operation, the selector valve 165 may be positioned to select "low range" wherein the planetary gearing unit is maintained in reduction drive irrespective of vehicle speed.

Figure 8:
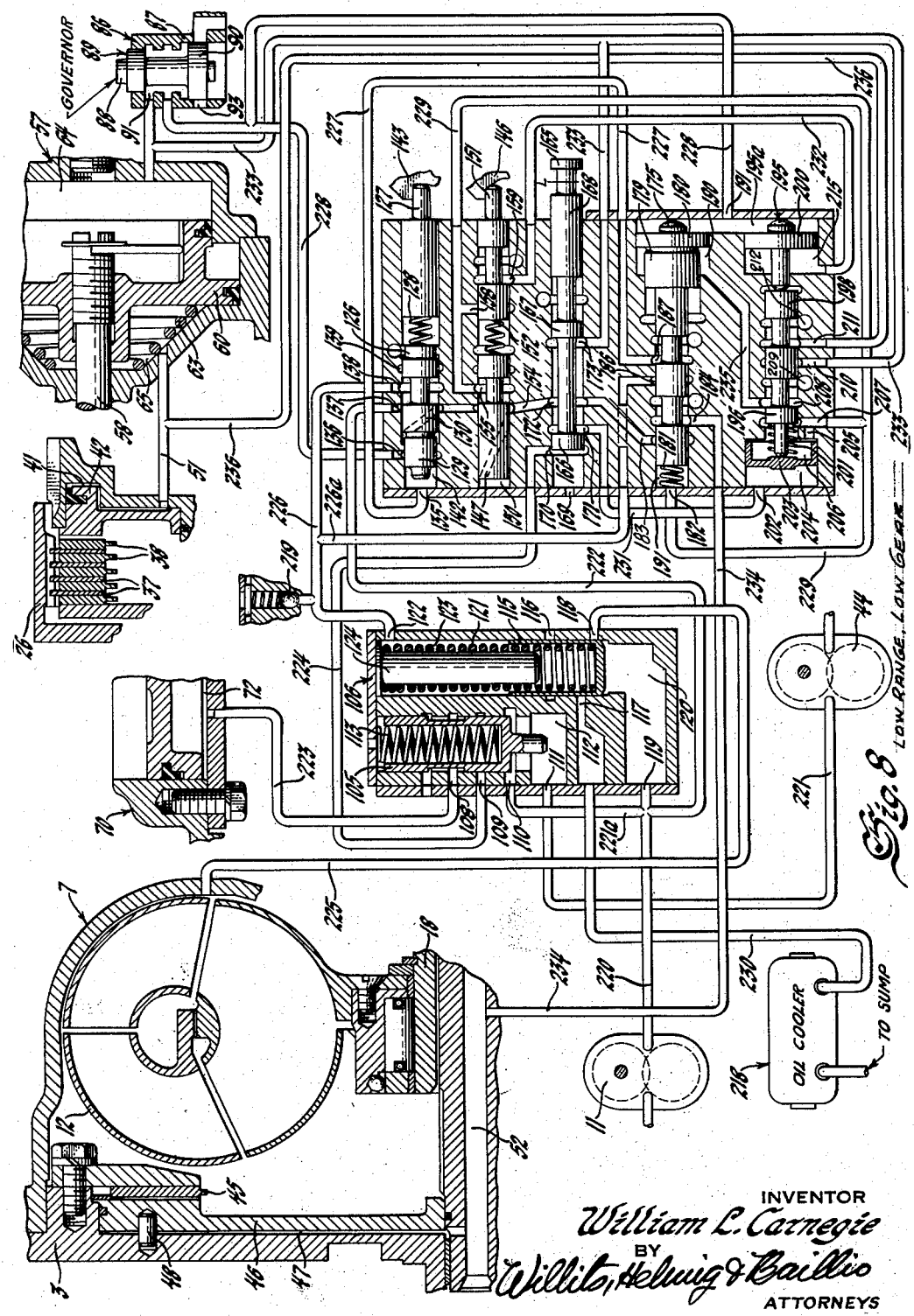
Figure 8 is a schematic diagram of the control system as conditioned for low range, low gear operation.

In Figure 8 the position of the manually operated selector valve 165 and that of the shift valves for low range operation is shown. In the low range position of valve 165, line pressure is supplied to chamber 204 of shift valve 195 by way of passage 222, ports 137 and 154, thence by ports 172 and 171 of valve 165 and passage 231. This pressure acting in chamber 204 forces piston 203 against spring 201 until the piston 203 strikes the end of a stem portion extending from land 196 of valve 195. The force effect of line pressure in chamber 204 plus that of throttle valve pressure in chamber 206 (from port 155 of throttle valve 145 and pipe 229) is of sufficient magnitude to overcome the force effect of governor pressure in chamber 195a, thereby preventing upshift from reduction drive to direct drive in the planetary gearing unit. Engine braking through the planetary gearing unit reduction drive train may thereby be accomplished. Servo 57 is applied by pressure supplied to passage 233 through ports 172 and 173 of selector valve 165.

*Reverse (Fig. 9)*

Figure 9:
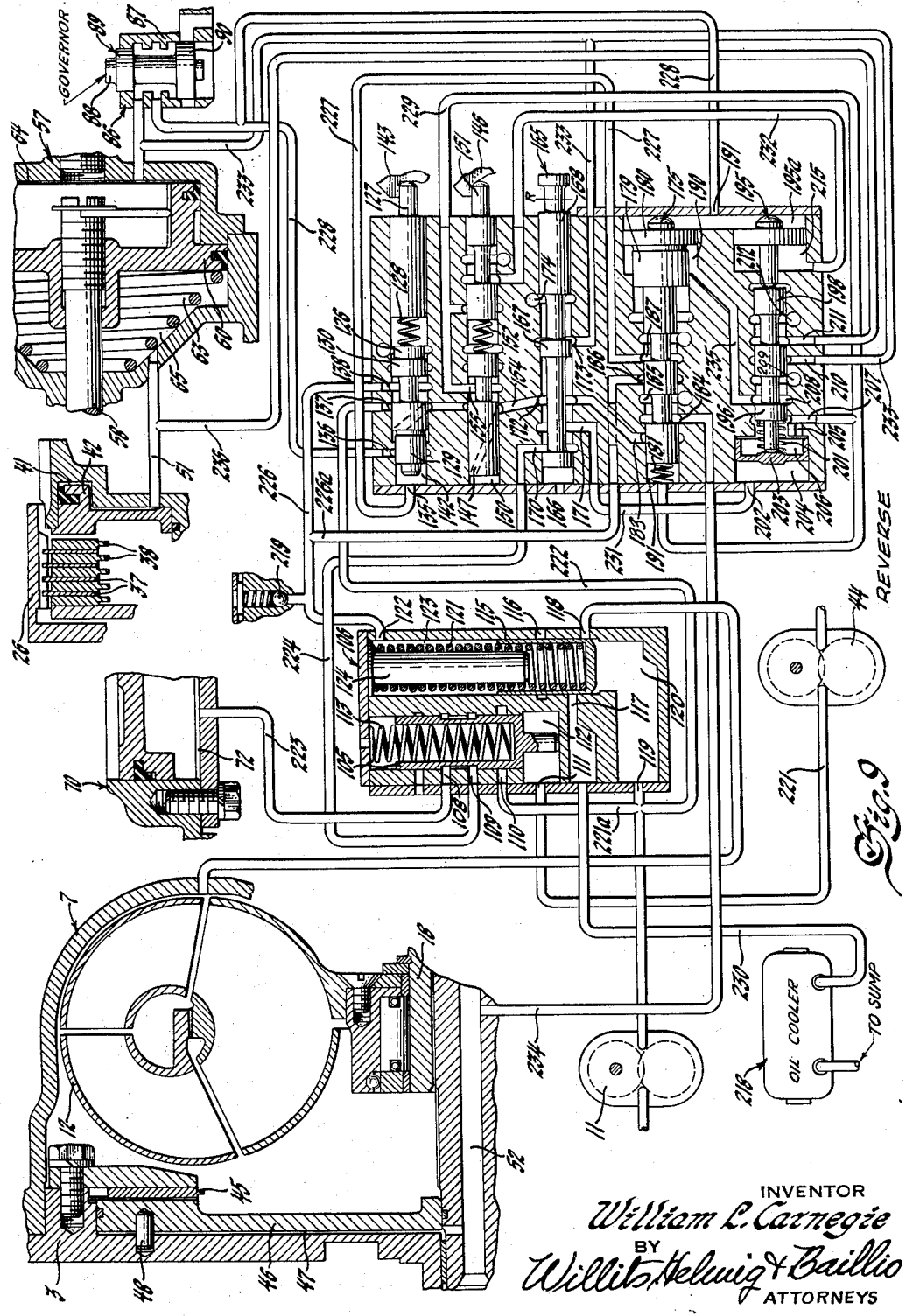
Figure 9 is a schematic diagram of the control system as conditioned for reverse operation.

The reverse condition of operation is illustrated in Figure 9. In reverse, the band 36 of Fig. 1 is applied to drum 35 of Fig. 1. All other servos are exhausted to the transmission sump. Upon positioning the selector lever 165 to reverse, passage 233 leading to governor 86 and servo 57 is exhausted through ports 173 and 174 of selector valve 165. Line pressure is supplied to chamber 204 of shift valve 195 through ports 172 and 171 and passage 231 just as in low gear. Due to the effect of line pressure in chamber 204, and due to the exhaust of governor pressure from chamber 195a by cutting off the supply of fluid pressure to the governor 86, no upshift can occur in reverse.

Line pressure is supplied to the reverse servo chamber 72 by way of main line passage 222, ports 172 and 170 of selector valve 165, passage 224, ports 109 and 108 of reverse shift inhibitor valve 105 and passage 223. As was earlier explained, reverse shift inhibitor valve 105 is acted upon by pressure delivered from the vehicle speed responsive pump 44 and is effective at speeds above a predetermined vehicle speed to exhaust pressure from passage 223 even though the selector valve 165 may be placed in its reverse position. As the vehicle speed is reduced pressure in chamber 112 is reduced until spring 113 is able to position valve 105 as shown in Fig. 9 to connect passage 224 to passage 223 to admit line pressure to reverse servo chamber 72. In reverse, low band supply passage 233 is exhausted through ports 173 and 174 of selector valve 165, and torque converter lock-up clutch supply passage 234 is exhausted through ports 184 and 185 of shift valve 175. Direct drive clutch supply passage 236 is exhausted through ports 211 and 212 of valve 195. With the servo chamber 72 pressurized, band 36 is applied to drum 35 of Figure 1 for reverse operation.

Figure 10:
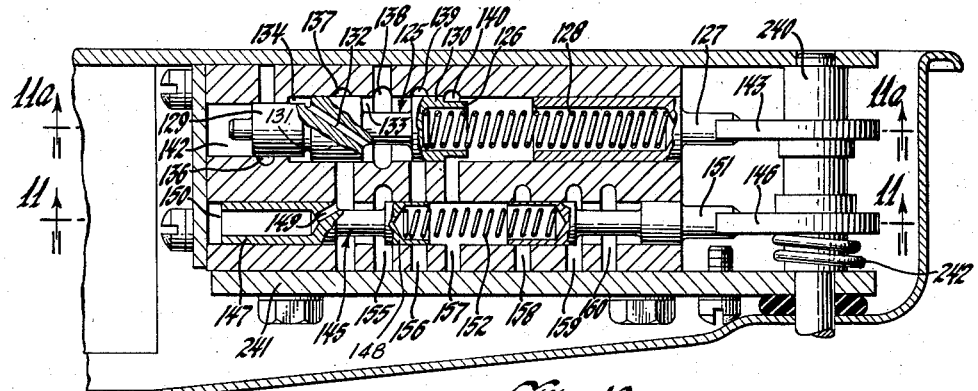
Figure 10 is a partially sectional view illustrating the relationship of a pair of fluid pressure metering valves and the cams for operating the valves.

In Figures 10 and 11 the arrangement of the cam shaft for actuating the throttle valve 145 and compensator valve 125 is shown. Shaft 240 is rotatably mounted in a housing 241, being positioned transverse to the valve plungers 127 and 151. A spring 242 yieldably biases the shaft 240 and cams 143 and 146 to the closed throttle position of the cams illustrated in Figures 11 and 11a. Shaft 240 may be connected to the engine throttle linkage by any suitable linkage, not shown, so as to rotate clockwise (as seen in Fig. 11) as the engine throttle is opened. The cams 143 and 146, upon clockwise rotation of shaft 240, force plungers 127 and 151, respectively, into the valve housing to control the pressure delivered by the valves as heretofore explained.

The shape of the throttle valve cam 146, shown in Figure 11 is so taken as to provide for a relatively low pressure delivery at initial throttle opening and to provide for a rapid rise in the pressure delivered by valve 145 after approximately fifteen degrees of throttle opening.

Figure 11A:
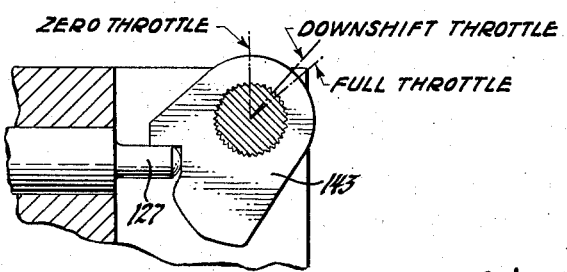
Figure 11A illustrates the shape of the cam for controlling one of the pressure metering valves illustrated in Figure 10.

Compensator cam 143 shown in Figure 11a is shaped to provide a rapid rise of compensator pressure as the throttle is initially opened and to provide for a decreasing rate of increase of compensator pressure after approximately fifteen degrees of engine throttle opening. The arrangement of the cams assures adequate line pressure to prevent slippage of the bands and clutches wherein the line pressure is a function of torque demand and provides a calibrated pressure control for timing the shifts as a function of torque demand and vehicle speed.

The preceding description recites the advantages, features, objects and useful results of this invention which incorporate a number of features in combination, which are subject to change in specific arrangement and form of structure without departing from the spirit and scope of the invention as set forth in the following claims.

I claim:

1. In a transmission, in combination, a torque converter having an impeller connected to a power input shaft and a turbine member, planetary gearing including a pair of ring gears fixed to each other for rotation as a unit, a pair of sun gears rigidly fixed to each other, and a pair of planet gears, means connecting both of said ring gears to said turbine member, a power output shaft, a planet carrier connected to said output shaft and supporting one of said pair of planet gears in mesh with one of said ring gears and sun gears, a second planet carrier supporting the other of said pair of planet gears in mesh with the other of said sun and ring gears, a brake drum fixed to said second planet carrier, brake means selectively operable for braking both of said sun gears, clutch means selectively operable for clutching both of said sun gears to said power output shaft, and brake means selectively operable for braking the second planet carrier.

2. In the combination set forth in claim 1, clutch means selectively operable for clutching said turbine member to said power input shaft.

3. In a power transmission for vehicle drives, an engine driven shaft, a torque converter having an impeller driven by said shaft, intermediate shaft, a torque converter turbine member connected to said intermediate shaft, a compound planetary gearing unit having a pair of ring gears driven by said intermediate shaft, a power output shaft, a planet carrier connected to said power output shaft, a sleeve member having a pair of sun gears thereon, planet gears meshing with said ring gears and sun gears, respectively, a second planet carrier, a brake drum fixed to said second planet carrier, brake means selectively operable for braking both of said sun gears, clutch means selectively operable for clutching both of said sun gears to said power output shaft, and brake means selectively operable for braking the second planet carrier.

4. In the combination set forth in claim 3, clutch means for directly clutching said turbine member and said intermediate shaft to said engine driven shaft.

5. In a vehicle transmission, in combination, a torque converter and a compound planetary gearing unit, said torque converter having an impeller connected to an engine driven shaft and a turbine member connected to an intermediate shaft, clutch means for selectively clutching said turbine member to said engine driven shaft, a power output shaft, a drum member driven by said intermediate shaft, a pair of ring gears on said drum member, a sleeve member, a pair of sun gears on said sleeve member, planet gears meshing with said ring gears and sun gears, respectively, a planet carrier for supporting one of said planet gears connected to said power output shaft, a planet carrier for the other of said planet gears, means for selectively braking said last-mentioned planet carrier, a drum member directly connected to said sleeve member, means for braking said drum member to prevent rotation of both of said sun gears, and a clutch for clutching both of said sun gears to said power output shaft.

6. The combination set forth in claim 5 including a clutch for clutching said torque converter turbine member to said engine driven shaft.

7. In power transmissions, an engine driven shaft, a torque converter having an impeller driven by said engine driven shaft, an intermediate shaft, a power output shaft, a torque converter turbine member directly connected to said intermediate shaft, a compound planetary gearing unit having a pair of ring gears driven by said intermediate shaft, clutch means selectively operable for clutching said turbine member and said intermediate shaft to said engine driven shaft, a sleeve member surrounding said power output shaft, a pair of sun gears carried by said sleeve member, a planet carrier fixed to said power output said sleeve member, a planet carrier fixed to said output shaft, planet gears supported by said carrier meshing with one set of said ring and sun gears, a second planet carrier, planet gears supported by said carrier meshing with another set of said ring and sun gears, means for braking said last-mentioned planet carrier to establish reverse drive ratio, means for braking both of said sun gears for establishing reduction forward drive ratio through said torque converter and planetary gearing unit, and means for clutching both of said sun gears to said power output shaft for establishing reduction drive through drive through said torque converter and direct drive through said planetary gearing unit, said torque converter turbine clutch means and said planetary gearing unit clutch means being operable simultaneously to establish direct forward drive from said engine driven shaft to said power output shaft.

8. In a vehicle transmission, in combination, a torque converter and a compound planetary gearing unit, said torque converter having an impeller driven by an engine driven shaft and a turbine member for driving an intermediate shaft, a clutch selectively operable for directly connecting said intermediate shaft and said turbine member to said engine driven shaft, a pair of ring gears driven by said intermediate shaft, a power output shaft, a sleeve member, a pair of sun gears fixed to said sleeve member, one of said sun gears being of greater diameter than the other of said sun gears, planet gears meshing with one of said ring gears and the larger of said sun gears, planet gears meshing with the other of said ring gears and the smaller of said sun gears, a planet carrier for one of said sets of planet gears directly connected to said power output shaft, a planet carrier for the other of said sets of planet gears, brake means for braking said last mentioned planet carrier to establish reverse drive through said torque converter and planetary gearing unit, brake means for braking both of said sun gears for establishing drive through said torque converter and reduction drive through said planetary gearing unit, and clutch means for clutching both of said sun gears to said power output shaft for establishing drive through said torque converter and direct drive through said planetary gearing unit, said turbine clutch and said last-mentioned clutch being simultaneously operable to establish direct drive from said engine driven shaft to said power output shaft.

9. In a power transmission, in combination, a torque converter having an impeller and a turbine member, an intermediate shaft connected to said turbine member, an engine driven shaft for driving said impeller member, a compound planetary gearing unit having a pair of ring gears driven by said intermediate shaft, a sleeve member, a power output shaft, a pair of sun gears fixed to said sleeve members, one of said sun gears being of greater diameter than the other of said sun gears, a first planet carrier fixed to said power output shaft, a planet gear supported by said carrier in mesh with one of said ring gears and one of said sun gears, a second planet carrier, a planet gear supported by said second planet carrier in mesh with the other of said ring and sun gears, brake means for braking said second planet carrier to establish reverse drive through said first planet carrier, brake means for braking both of said sun gears to establish reduction drive through said first planet carrier, and clutch means for clutching both of said sun gears to said first planet carrier for establishing direct drive through said first planet carrier.

10. The combination set forth in claim 7 including clutch means for clutching both of said ring gears and said turbine member to said impeller for establishing direct drive from said engine driven shaft to said power output driven shaft.

11. In a transmission, a torque converter, a planetary gearing unit adapted to provide neutral, reverse drive, forward reduction and forward direct drive, a direct drive clutch for locking up said torque converter, fluid pressure responsive servo members for establishing reverse drive, forward drive through said converter and planetary reduction gearing, forward drive through said converter and direct drive through said planetary gearing, and for locking up said converter and planetary gearing to establish direct forward drive, a fluid presssure source, a shift valve for controlling said converter direct drive servo member, a shift valve for controlling said planetary gearing reduction drive and direct drive servo members, and a line pressure regulator valve for controlling the pressure level of fluid pressure supplied to said servos, first means responsive to engine torque demand for controlling the pressure regulator, second means responsive to engine torque demand and vehicle speed for controlling the pressure regulator, means responsive to one position of the torque converter shift valve for connecting said first means to the pressure regulator and responsive to a second position of said torque converter shift valve for connecting said second means to the pressure regulator.

12. In a vehicle transmission having a plurality of fluid pressure responsive servo members operable to establish different transmission drive ratios, a fluid pressure source, a pressure regulator valve for controlling the range of pressure of fluid pressure supplied to said servos, a pressure metering valve effective to deliver to said regulator valve fluid at a pressure which is a function of engine torque demand, a governor controlled valve adapted to deliver fluid at a pressure which is a function of vehicle speed and a shift valve for controlling the admission of fluid pressure from said source to one of said servo members, said shift valve being effective in one position thereof to deliver fluid pressure from the governor controlled valve to said pressure metering valve, said pressure metering valve being effective in said last-mentioned position of said shift valve to deliver a variable pressure to said pressure regulator valve which varies as a function of vehicle speed and engine torque demand.

13. In a vehicle transmission having a plurality of fluid pressure responsive servo members for establishing different transmission drive ratios, a fluid pressure source, a pressure regulator valve for controlling the pressure level of fluid pressure supplied to said servos, an accelerator pedal controlled pressure metering valve effective to deliver a variable pressure to said pressure regulator valve, the pressure level of the fluid pressure delivered by said accelerator pedal controlled valve being increased as said accelerator pedal is moved from a throttle closing to a throttle opening position, a shift valve for controlling one of said servos, a vehicle speed responsive governor adapted to deliver a variable fluid pressure which increases with increase of vehicle speed hydraulically connected to said pressure metering valve, and a control chamber associated with said accelerator pedal controlled valve, said shaft valve being effective in one position to connect said control chamber to exhaust and effective in a second position to deliver fluid pressure to said control chamber, said accelerator pedal controlled valve being responsive to pressure delivered to said control chamber by said shift valve to admit governor pressure to said pressure regulator valve.

14. In a vehicle transmission having a plurality of fluid pressure responsive servo members for establishing different transmission drive ratios, a fluid pressure source, a pressure regulator valve for controlling the pressure level of fluid pressure supplied to said servos, an accelerator pedal controlled pressure metering valve effective to deliver a variable pressure to said pressure regulator valve, a control chamber associated with said pressure metering valve, means including a shift valve for controlling the transmission drive ratio, and a vehicle speed responsive governor for delivering a variable fluid pressure connected to said pressure metering valve, said shift valve being effective in one position to connect said control chamber to exhaust and effective in a second position to connect said control chamber to the pressure discharge of said pressure metering valve, said last-mentioned valve being movable by fluid pressure in said control chamber to admit governor pressure to said pressure regulator valve through said shift valve.

15. In an engine driven vehicle transmission having a plurality of fluid pressure responsive servo for establishing different drive ratios, a source of fluid under pressure connected to the servos, a pressure regulator for controlling the pressure of fluid supplied to said servos, an engine throttle controlled valve effective to exert a variable force on said pressure regulator, the force exerted by said valve being increased as the engine throttle is opened, a control chamber in said valve, a shift valve for controlling one of said servo members, a vehicle speed responsive governor controlled valve adapted to deliver fluid at a pressure which increases with increase of vehicle speed, and means hydraulically connecting said governor controlled valve to said engine throttle controlled valve, said shift valve being effective in one position to empty said control chamber and effective in a second position to connect said control chamber to the pressure delivering output of said throttle controlled valve, said throttle controlled valve being responsive to fluid pressure in said control chamber to admit governor pressure to said pressure regulator through said shift valve.

16. In a vehicle transmission having a torque converter and a planetary gearing unit, an oil cooler, fluid pressure responsive servo members for establishing different transmission drive ratios, a fluid pressure source, a shift valve for controlling the admission of fluid pressure to one of said servo members, a pressure regulator valve for controlling the pressure level of fluid pressure delivered to said servos, spring means yieldably biasing said pressure regulator valve to maintain a minimum line pressure, said pressure regulator valve controlling the admission of fluid pressure to said torque converter and said oil cooler, a pressure metering valve for delivering a variable metered pressure, a control chamber in said pressure regulating valve hydraulically connected to said pressure metering valve, a vehicle speed responsive governor adapted to deliver a variable fluid pressure hydraulically connected to said pressure metering valve, and a control chamber in said pressure metering valve, said shift valve being effective in one position thereof to connect said last-mentioned control chamber to exhaust and effective in a second position thereof to connect said last-mentioned control chamber to pressure fluid delivered by said pressure metering valve, said pressure metering valve being responsive to pressure fluid in said control chamber to admit governor pressure to said pressure regulator valve control chamber.

17. In a transmission, a torque converter having an impeller and a turbine member, an engine driven shaft for driving said impeller, a planetary gearing unit having a pair of ring gears driven by said turbine member, a sleeve member, a power output shaft, a pair of sun gears fixed to said sleeve member, a planet carrier fixed to said output shaft, a planet gear supported upon said carrier meshing with one of said ring gears and one of said sun gears, a second planet carrier, a second planet gear supported upon said second planet carrier in mesh with a second of said ring and sun gears, a fluid pressure responsive servo for braking said second carrier to establish reverse drive, a fluid pressure responsive servo for braking both of said sun gears to establish reduction drive through said planetary gearing unit, a fluid pressure responsive servo for clutching both of said sun gears in fixed relation to said first-mentioned carrier, a fluid pressure responsive servo for clutching both of said ring gears and said turbine member to said impeller member, a fluid pressure source, valve means including a shift valve for controlling said torque converter clutch, and a shift valve for controlling said planetary gearing unit clutch and brake, and valve means normally effective to vary the pressure level of fluid pressure supplied to said servo as a function of engine torque demand, said valve means being controlled by said torque converter clutch control shift valve to control the line pressure supplied to said servos as a function of vehicle speed and engine torque demand when said shift valve is effective to deliver fluid pressure to torque converter clutch.

18. In a vehicle transmission having a torque converter and planetary gearing unit, a clutch for locking up said torque converter, a clutch and a brake for establishing different forward drive ratios through said planetary gearing unit, a fluid pressure source, means for controlling the admission of fluid pressure from said source to said clutches and brake including a pair of shift valves and a manually operable selector valve, a vehicle speed responsive governor controlled valve for delivering a variable fluid pressure to said shift valves to upshift the same, a pressure metering valve for delivering a variable fluid pressure from said source to said shift valves to downshift the same, and a control chamber associated with one of said shift valves controlled by the other of said shift valves, said other shift valve being effective in one position to connect said control chamber to exhaust and effective in a second position to admit fluid pressure from said pressure metering valve to said control chamber.

19. In a vehicle transmission having a torque converter and planetary gearing unit, a clutch for locking up said torque converter, a clutch and a brake for establishing different forward drive ratios through said planetary gearing unit, fluid pressure responsive servo members for actuating said clutches and brake, respectively, a fluid pressure source means including a pair of shift valves and a manually operable selector valve for controlling the admission of fluid pressure to said servos, a manually operable pressure metering valve for delivering a variable metered pressure to said shift valves tending to downshift the same, and a vehicle speed responsive governor for delivering a variable fluid pressure to said shift valves to upshift the same, said selector valve being movable to one position to select one drive range wherein said shift valves may be effective to establish a plurality of drive ratios, said selector valve being effective in a second position to deliver fluid perssure from said source to one of said shift valves to maintain said transmission in one gear ratio irrespective of vehicle speed.

20. In a transmission for engine driven vehicles, means for establishing a plurality of drive ratios; fluid pressure servo means for actuating the ratio-determining means; a source of fluid under pressure adapted to be connected to the servo means; a selector valve for controlling the connection between the source and the servo means; and means for maintaining different ranges of pressure in said servo means in response to establishment of different drive ratios including a pressure regulator for the source, means for controlling the pressure regulator in response to engine torque demand and for controlling the pressure regulator in response both to engine torque demand and vehicle speed, and means responsive to the position of the selector valve for determining the action of the controlling means.

21. In a transmission for engine-driven vehicles, means for establishing a plurality of drive ratios; fluid pressure servo means for actuating the ratio-determining means; a source of fluid under pressure adapted to be connected to the servo means; means including a fluid pressure controlled shift valve for controlling the connection between the source and the servo means; and means for maintaining different ranges of pressure of said source in response to establishment of different drive ratios including a pressure regulator valve for the source, means including an accelerator pedal controlled pressure metering valve for controlling the pressure regulator valve selectively to establish a plurality of pressure ranges, and means responsive to the position of the fluid pressure controlled shift valve and associated with said pressure metering valve for selecting the pressure range established by the regulator valve.

22. In a transmission for engine driven vehicles, in combination a power input member connectible by a clutch to a change-speed gearing adapted selectively to be connected at different drive ratios to power output member; a fluid pressure servo for actuating the clutch; a source of fluid under pressure connectible to the servo; drive ratio control means including a fluid pressure controlled shift valve, a pressure regulator for the source, a driver operable pressure metering valve connected to the source and adapted to deliver fluid under variable pressure to said pressure regulator valve to control the pressure delivered by said pressure regulator valve, a control chamber associated with said pressure metering valve and controlled by said shift valve, said shift valve being effective in one position to connect said control chamber to exhaust and effective in a second position to deliver fluid under pressure to said control chamber, said pressure metering valve being effective when said control chamber is connected to exhaust to control said pressure regulator valve to deliver a first range of pressure and said pressure metering valve being effective when said control chamber is supplied with fluid pressure from said shift valve to control said pressure regulator valve to deliver a second range of fluid pressure.

23. In a transmission for engine-driven vehicles, in combination a power input member connectible by a clutch to a change-speed gearing adapted selectively to be connected at different drive ratios to power output member; a fluid pressure servo for actuating the clutch; a source of fluid under pressure connectible to the servo; drive ratio control means including a fluid pressure controlled shift valve, a pressure regulator valve, a driver operable pressure metering valve connected to the source and adapted to deliver fluid under pressure to said pressure regulator valve to control the pressure delivered by said pressure regulator valve, a control chamber associated with said pressure metering valve and controlled by said shift valve, said shift valve being effective in a first position to connect both said clutch servo and said pressure metering valve control chamber to exhaust, said shift valve being effective in a second position to deliver fluid pressure to both said clutch servo and said pressure metering valve control chamber said pressure metering valve being effective in said first position of said shift valve to control said pressure regulator valve to deliver a relatively high range of fluid pressure and said pressure metering valve being effective in said second position of said shift valve to control said pressure regulator valve to deliver a relatively low range of fluid pressure.

24. In a transmission, in combination, a torque converter having an impeller connected to a power input shaft, and a turbine member, a planetary gearing system including a pair of ring gears, means connecting said ring gears rigidly to each other for rotation as a unit and to said turbine member, a pair of sun gears rigidly connected to each other, a power output shaft, a first planet carrier connected to said output shaft for driving said shaft, planet gears supported by said carrier in mesh with one of said pair of ring gears and one of said pair of sun gears, a second planet carrier, planet gears supported upon said second planet carrier in mesh with the second of said pair of ring gears and the second of said pair of sun gears, brake means selectively operable to prevent rotation of said second planet carrier, a single brake selectively operable to prevent rotation of both of said sun gears, and a single clutch selectively operable to clutch both of said sun gears to said output shaft.

25. The combination set forth in claim 24 including an additional clutch selectively operable to connect said turbine member to said power input shaft.

26. In a vehicle transmission having a torque converter and planetary gearing unit, a clutch for locking up said torque converter, a clutch and a brake for establishing different forward drive ratios through said planetary gearing unit, fluid pressure responsive servo members for actuating said clutch and brake, respectively, a fluid pressure source, means including a pair of shift valves and a manually operable selector valve for controlling the admission of fluid pressure to said servos, a manually operable pressure metering valve for delivering a variable metered pressure to said shift valves tending to downshift the same, and a vehicle speed responsive governor for delivering a variable fluid pressure to said shift valves to upshift the same, said selector valve being movable to one position to select one drive range wherein said shift valves may be effective to establish a plurality of drive ratios, said selector valve being effective in a second position to deliver fluid pressure from said source to one of said shift valves to maintain said planetary gearing unit in reduction drive irrespective of vehicle speed.

27. In a transmission for engine driven vehicles, means for establishing different drive ratios, fluid pressure responsive servo motors operable to establish different conditions of drive through said transmission, a source of fluid under pressure adapted to be connected to said servo motors, means including a fluid pressure controlled shift valve for controlling the connection between said source and one of said servo motors, and means for maintaining different ranges of fluid pressure in response to establishment of different drive ratios including a pressure regulator valve for said source, additional manually operable pressure metering valve means for controlling said pressure regulator valve selectively to establish a plurality of pressure ranges, and means associated with said pressure metering valve means controlled by said fluid pressure controlled shift valve for selecting the pressure range established by said pressure regulator valve.

28. In a transmission for engine driven vehicles, a power input member connectible by a clutch to change-speed gearing adapted selectively to be connected at different drive ratios to a power output member, fluid pressure servo motors adapted to establish different drive ratios in said gearing, a servo motor for actuating said clutch, a fluid pressure source adapted to be connected to said servo motors, means including a fluid pressure controlled shift valve for controlling the admission of fluid pressure from said source to the servo motors associated with said gearing for controlling the gearing drive ratio, a line pressure regulator valve for controlling the pressure value of fluid pressure supplied to said servo motors, a driver operable pressure metering valve operable to deliver a variable pressure to said line pressure regulator valve to control the action of said line pressure regulator valve, a second fluid pressure controlled shift valve for controlling the admission of fluid pressure to said clutch servo motor, and means controlled by said second shift valve operable upon said driver operable pressure metering valve to position said pressure metering valve to deliver pressure in a different range of pressure in one position of said second shift valve than that delivered by said pressure metering valve in a second position of said second shift valve.

29. In a transmission for an engine driven vehicle, a planetary gearing unit adapted to be driven through either a fluid torque converter or direct drive clutch, fluid pressure responsive servo motors operable to establish different drive ratios in said gearing unit, a clutch servo motor operable to engage said clutch, a fluid pressure source, a line pressure regulator valve for controlling the pressure value of fluid pressure supplied to said servo motors, a driver operable pressure metering valve connected to said source and adapted to deliver a variable pressure to said line pressure regulator valve to control the line pressure in accordance with the position of said pressure metering valve throughout its range of movement, means including a first fluid pressure controlled shift valve connected to said source and adapted to control the drive ratio of said planetary gearing unit, a second fluid pressure controlled shift valve connected to said fluid pressure source and adapted to control the admission of fluid pressure to said clutch servo motor, and means associated with said pressure metering valve and responsive to fluid pressure delivered by said second shift valve for positioning said pressure metering valve to deliver a variable pressure in a different range of pressures when said second shift valve is positioned to apply said clutch than that delivered by said pressure metering valve when said second shift valve is positioned to release said clutch.

References Cited in the file of this patent
UNITED STATES PATENTS
2,332,593    Nutt et al. _____ Oct. 26, 1943
(Other references on following page)

UNITED STATES PATENTS

| | | |
|---|---|---|
| 2,374,303 | Osborne | Apr. 24, 1945 |
| 2,516,208 | Hasbany | July 25, 1950 |
| 2,549,090 | Hobbs | Apr. 17, 1951 |
| 2,568,007 | Jandasek | Sept. 18, 1951 |
| 2,604,197 | Livermore | July 22, 1952 |
| 2,633,035 | Livermore | Mar. 31, 1953 |
| 2,640,373 | Jandasek | June 2, 1953 |
| 2,645,137 | Roche | July 14, 1953 |
| 2,648,992 | Vincent | Aug. 18, 1953 |
| 2,667,085 | Ackerman | Jan. 26, 1954 |
| 2,720,124 | Polomski | Oct. 11, 1955 |

OTHER REFERENCES

Automotive Industries, pp. 26–30, 85 and 88, Dec. 15, 1949.